United States Patent [19]

Yamada et al.

[11] Patent Number: 5,671,622
[45] Date of Patent: Sep. 30, 1997

[54] STRUCTURE FOR CONTAINING U-SHAPED BURGLARPROOF LOCK IN A MOTORCYCLE

[75] Inventors: Hajime Yamada; Hiroo Takemura, both of Saitama, Japan

[73] Assignee: Honda Giken Kogyo Kabushiki Kaisha, Tokyo, Japan

[21] Appl. No.: 622,167

[22] Filed: Mar. 27, 1996

[30] Foreign Application Priority Data

Aug. 24, 1995 [JP] Japan .................................. 7-215559

[51] Int. Cl.⁶ .................................................. B62H 5/00
[52] U.S. Cl. ........................................ 70/233; 224/935
[58] Field of Search ........................... 70/233–236, 261, 70/51; 224/935; 297/195.12, 195.13; 248/552

[56] References Cited

U.S. PATENT DOCUMENTS

| | | | |
|---|---|---|---|
| 4,436,232 | 3/1984 | Zane et al. | 70/233 X |
| 4,445,468 | 5/1984 | Onishi et al. | 123/73 C |
| 5,127,562 | 7/1992 | Zane et al. | 70/233 X |
| 5,156,031 | 10/1992 | Gaul | 70/233 |
| 5,179,848 | 1/1993 | Kief | 70/233 X |
| 5,226,341 | 7/1993 | Shores | 70/233 X |
| 5,251,796 | 10/1993 | Shelhart | 224/935 X |
| 5,560,445 | 10/1996 | Saito et al. | 70/233 X |

FOREIGN PATENT DOCUMENTS

| | | |
|---|---|---|
| 0287038 | 10/1988 | European Pat. Off. |
| 0636776 | 2/1995 | European Pat. Off. |
| 7052850 | 2/1995 | Japan . |

OTHER PUBLICATIONS

European Patent Office, vol. 13, No. 148, English Abstract of Japanese Patent 63–309737, Dec. 16, 1988.

European Patent Office, vol. 13, No. 335, English Abstract of Japanese Patent 11–13527, May 2, 1989.

Vol. 10 No. 151, English Abstract of Japanese Patent 61–4819.

*Primary Examiner*—Lloyd A. Gall
*Attorney, Agent, or Firm*—Birch, Stewart, Kolasch & Birch, LLP

[57] ABSTRACT

To provide a structure for containing a U-shaped burglarproof lock in a motorcycle. The motorcycle includes a body frame having a pair of right and left seat frames. A seat is removably mounted on the seat frames. A U-shaped burglarproof lock is provided with an approximately U-shaped hook and a bar releasably locked with an opened end of the hook. The burglarproof lock can be contained without increasing the number of parts and also without affecting both the height of the seat or the arrangement space for members under the seat. Fitted recessed portions are each provided in the inner surfaces of both seat frames to conform with and to removably retain and hold a hook positioned at an attitude substantially along a longitudinal direction of the motorcycle under the seat.

20 Claims, 5 Drawing Sheets

STRUCTURE FOR CONTAINING U-SHAPED BURGLARPROOF LOCK IN A MOTORCYCLE

BACKGROUND OF THE INVENTION

1. Field of the Invention

The present invention relates to a structure for containing a U-shaped burglarproof lock in a motorcycle. The motorcycle includes a body frame having a head pipe for operably supporting a front fork, main frames extending rearwardly from the head pipe, and a pair of right and left seat frames spaced from each other and extending rearwardly from rear portions of the main frames. A seat is removably mounted on the seat frames. A U-shaped burglarproof lock including an approximately U-shaped hook having a pair of substantially parallel rod-like portions and a circular arc curved portion continuous at one end of the substantially parallel rod-like portion, and a bar releasably locked to an opened end of the hook.

2. Description of Background Art

A U-shaped burglarproof lock is disclosed, for example, in Japanese Patent Laid-open No. Hei 07052850A. In this structure, a holding member for holding a U-shaped burglarproof lock is provided on a bottom plate of a seat or on a member positioned under the seat. The provision of such a holding member for holding the U-shaped lock is inconvenient because it increases the number of parts. Moreover, the holding member provided on the bottom plate of the seat affects the height of the seat. On the other hand, the holding member provided on a member positioned under the seat affects the arrangement space for members positioned under the seat, for example, an air cleaner case and the like.

OBJECTS AND SUMMARY OF THE INVENTION

In view of the foregoing, the present invention has been made, and an object of the present invention is to provide a structure for containing a U-shaped burglarproof lock in a motorcycle, which can contain the U-shaped lock without increasing the number of parts and also without affecting both the height of a seat and an arrangement space for members positioned under the seat.

To achieve the above object, according to the invention, there is provided a structure for containing a U-shaped burglarproof lock in a motorcycle, the motorcycle includes a body frame including a head pipe for operably supporting a front fork, main frames extending rearwardly from the head pipe, and a pair of right and left seat frames spaced from each other and extending rearwardly from rear portions of the main frames. A seat is removably mounted on the seat frames. A U-shaped burglarproof lock includes an approximately U-shaped hook having a pair of substantially parallel rod-like portions and a circular arc curved portion continuous at its both ends to one-sided ends of the rod-like portions. A bar is releasably locked with opened ends of the hook. Fitted recessed portions are formed in inner surfaces of the seat frames to conform in shape to removably retain, fit and hold the hook positioned at an attitude substantially along the longitudinal direction of the motorcycle under the seat.

In addition to the above, the fitted recessed portions are each provided in the inner surfaces of portions, near the main frames, of the seat frames, the seat frames being connected to the rear portions of the main frames and extending rearwardly therefrom with a gap formed between the seat frames being increased. The recessed portions are each formed in such shapes so as to restrict forward movement of the hook fitted in the recessed portions with the curved portion forward.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT OF THE INVENTION

Hereinafter, one embodiment of the present invention will be described with reference to the accompanying drawings.

Figure 1:
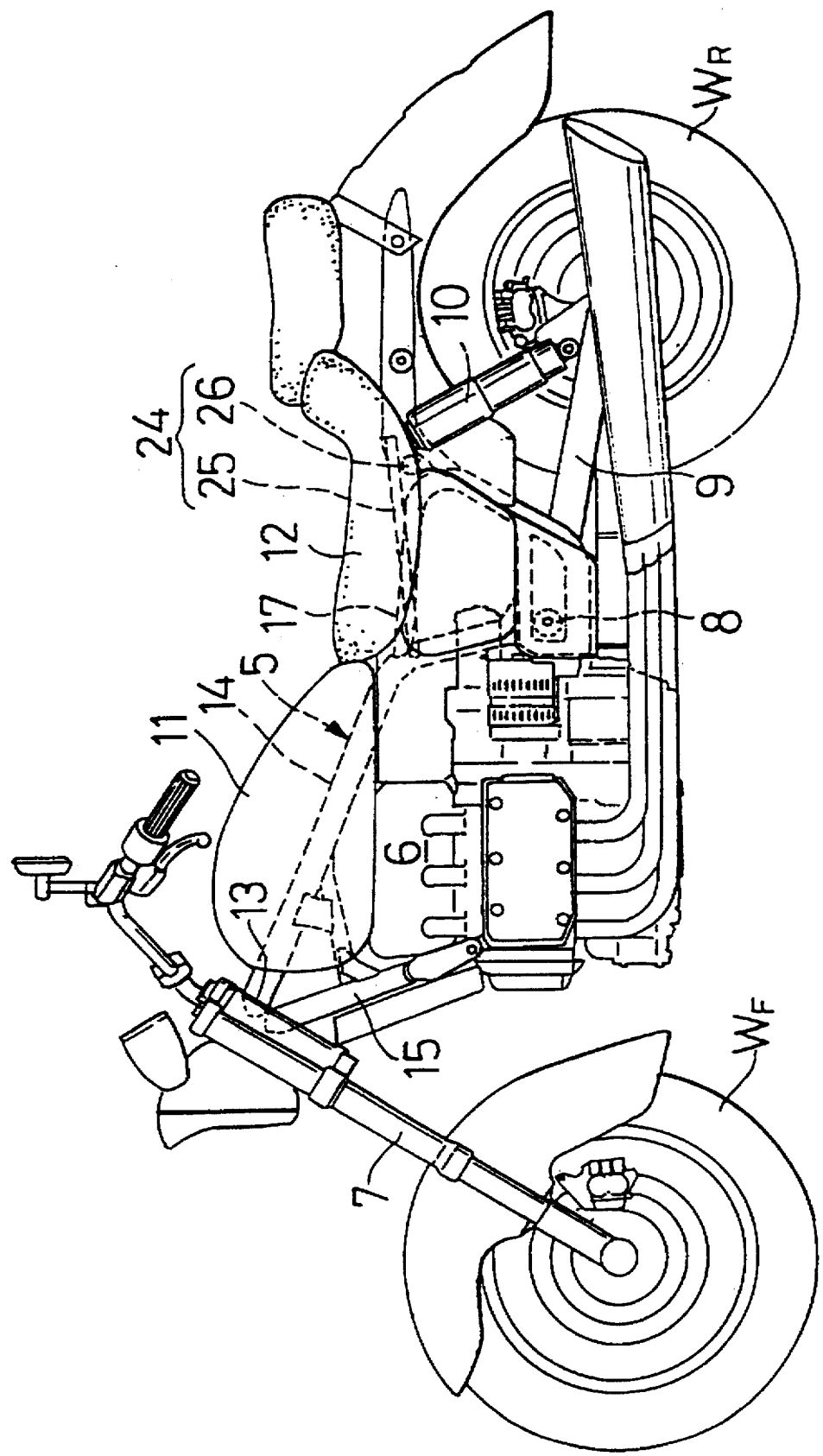
FIG. 1 is a side view of a motorcycle.

Referring first to FIG. 1, the motorcycle of the present invention mainly includes a body frame 5; a power unit 6 mounted on the body frame 5; a front fork 7 operably supported on the front end portion of the body frame 5 and supporting a front wheel WF. A rear fork 9 is vertically rockably connected to the rear portion of the body frame 5 through a pivot 8 and supporting a rear wheel WR. A shock absorber 10 with a suspension spring is provided between the body frame 5 and each of a pair of right and left leg portions of the rear fork 9. A fuel tank 11 is mounted on the front, upper portion of the body frame 5. A seat 12 is removably mounted on the rear, upper portion of the body frame 5.

Figure 2:
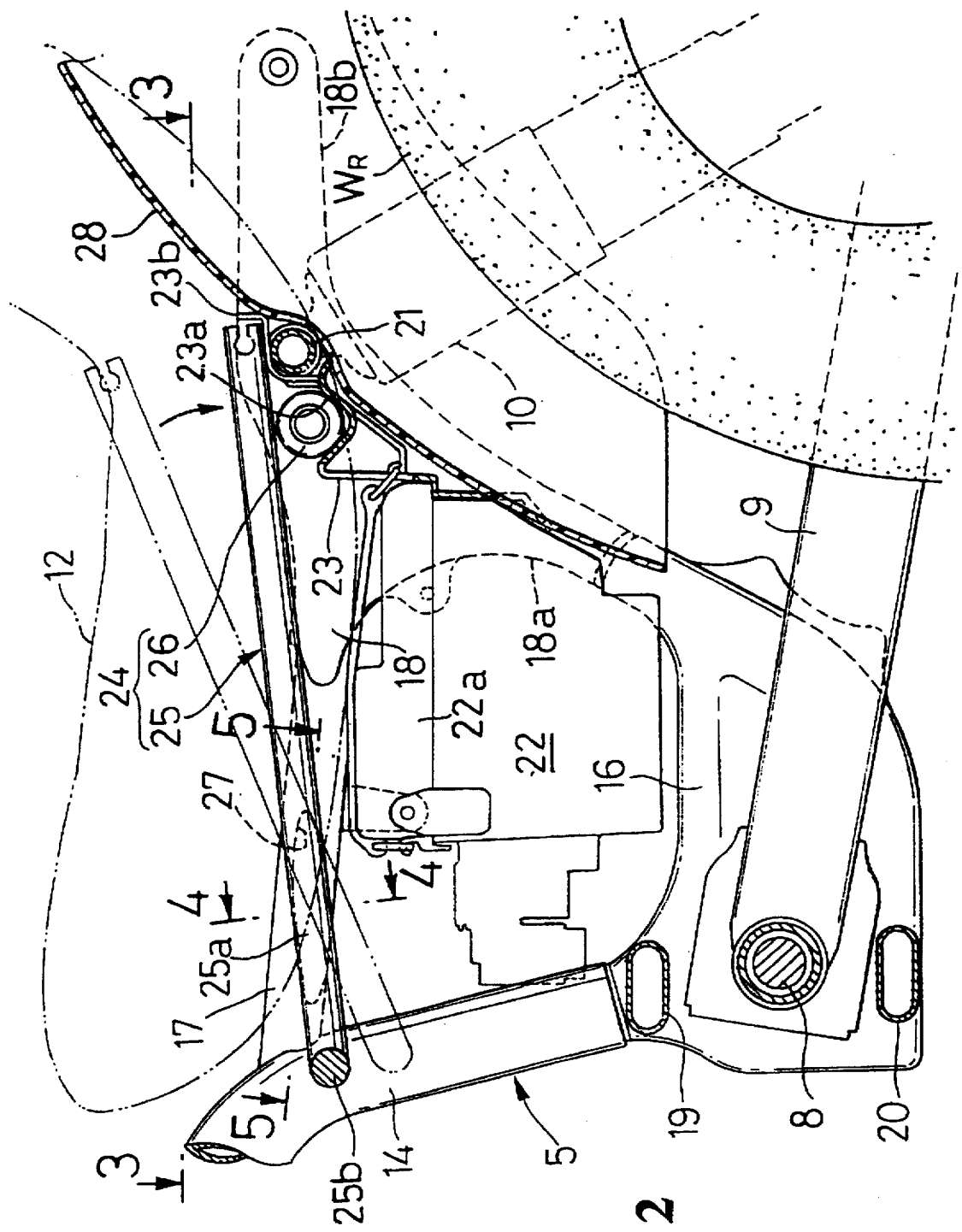
FIG. 2 is a vertical sectional side view, on an enlarged scale, of an essential portion of the motorcycle shown in FIG. 1.
Figure 3:
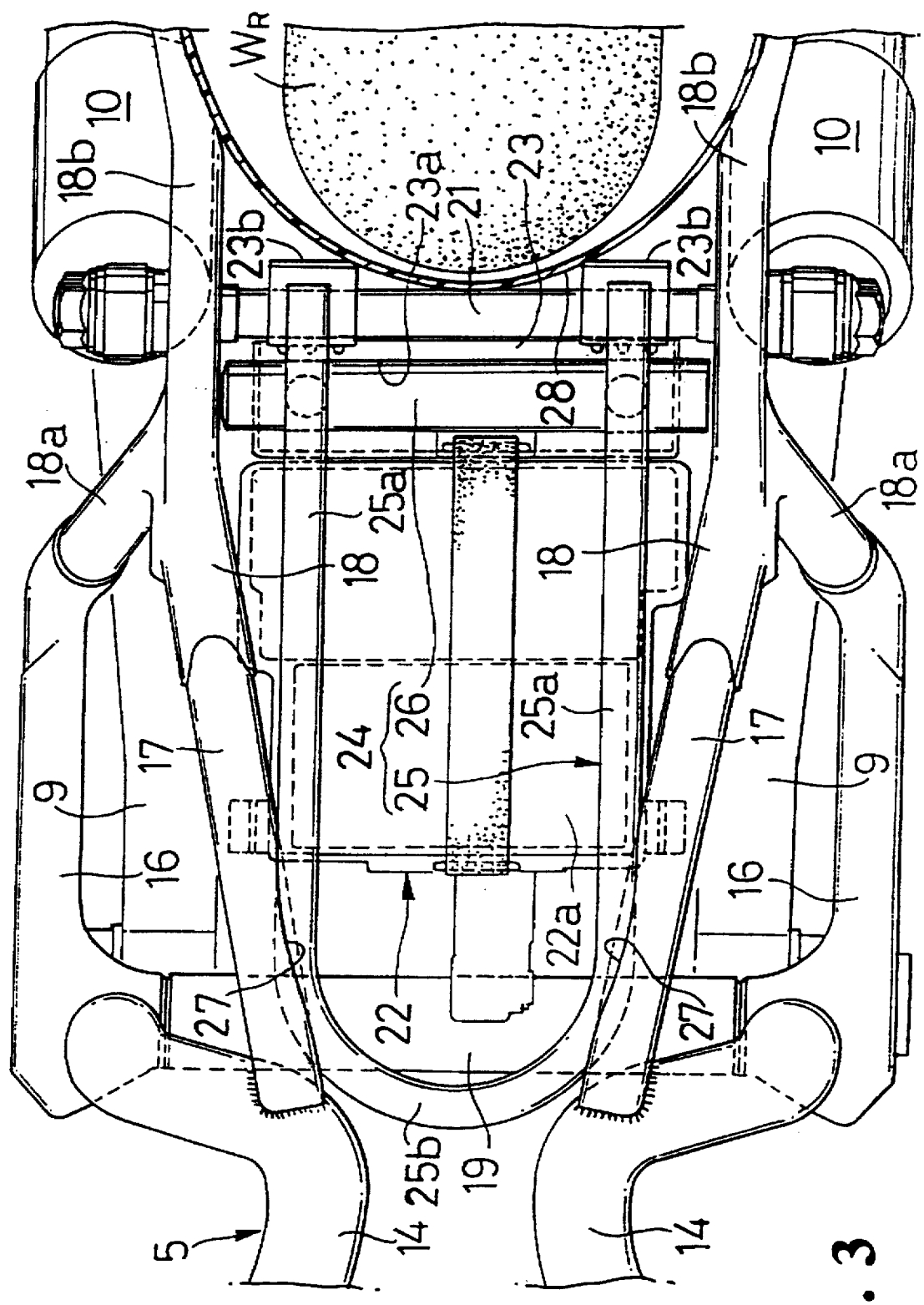
FIG. 3 is a sectional view taken on line 3—3 of FIG. 2.

Referring to FIGS. 1, 2 and 3, the body frame 5 includes a head pipe 13 for operably supporting the front fork 7, a pair of right and left main frames 14 made of steel pipe, spaced from each other and extending rearwardly from the head pipe 13, a pair of right and left downtubes 15 spaced from each other and extending rearwardly, obliquely, downwardly from the head pipe 13. The connecting plates 16 are each connected to the rear, lower ends of the main frames 14. A pair of right and left seat frames 17 each extend rearwardly and slightly downwardly from the rear, upper portions of the main frames 14. Connecting frames 18 are each connected to the rear ends of the seat frames 17. Each of the connecting frames 18 has a connecting pipe portion 18a which is connected to the connecting plate 16. A pair of upper and lower crossmembers 19, 20 are provided between both of the connecting plates 16. Each of the connecting frames 18 is integrated with a seat frame extension portion 18b being continuous to and extending rearwardly from the rear portion of the seat frame 17.

In such a body frame 15, the fuel tank 11 is fixedly mounted on both of the main frame 14. The seat 12 is removably mounted on both of the seat frames 17. The power unit 6, including an engine, transmission and the like, is fixed on both the downtubes 15 and on both the connecting plates 16. A connecting shaft 21 is provided between the seat frame extension portions 18b of both the connecting frames 18 at a position over a rear fender 28 for covering the rear wheel WR. Both the ends of the connecting shaft 21 each project outwardly from both the seat frame extension portions 18b, and the upper ends of the dampers 10 are each connected to both the projecting ends of the connecting shaft 21.

A battery box 22, having on the upper portion an openable lid 22a, is disposed at a position below the two seat frames 17. The battery box 22 is supported by a supporting member 23 fixed on the connecting shaft 21.

A U-shaped burglarproof lock 24 for the above-described motorcycle has a well known structure including an approximately U-shaped hook 25 and a bar 26. The hook 25 includes a pair of parallel rod-like portions 25a and a circular arc curved portion 25b continuous at both of the first ends of the rod-like portions 25a. The bar 26 functions to be locked with both the ends of the hook 25 and to be unlocked therefrom with a key (not shown). The U-shaped burglarproof lock 24 can be contained under the seat 12.

Figure 4:
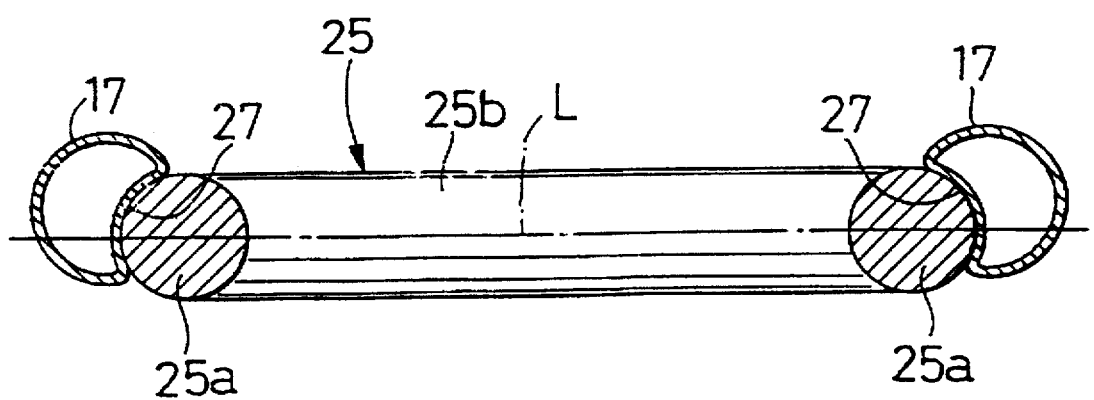
FIG. 4 is an enlarged sectional view taken on line 4—4 of FIG. 2.
Figure 5:
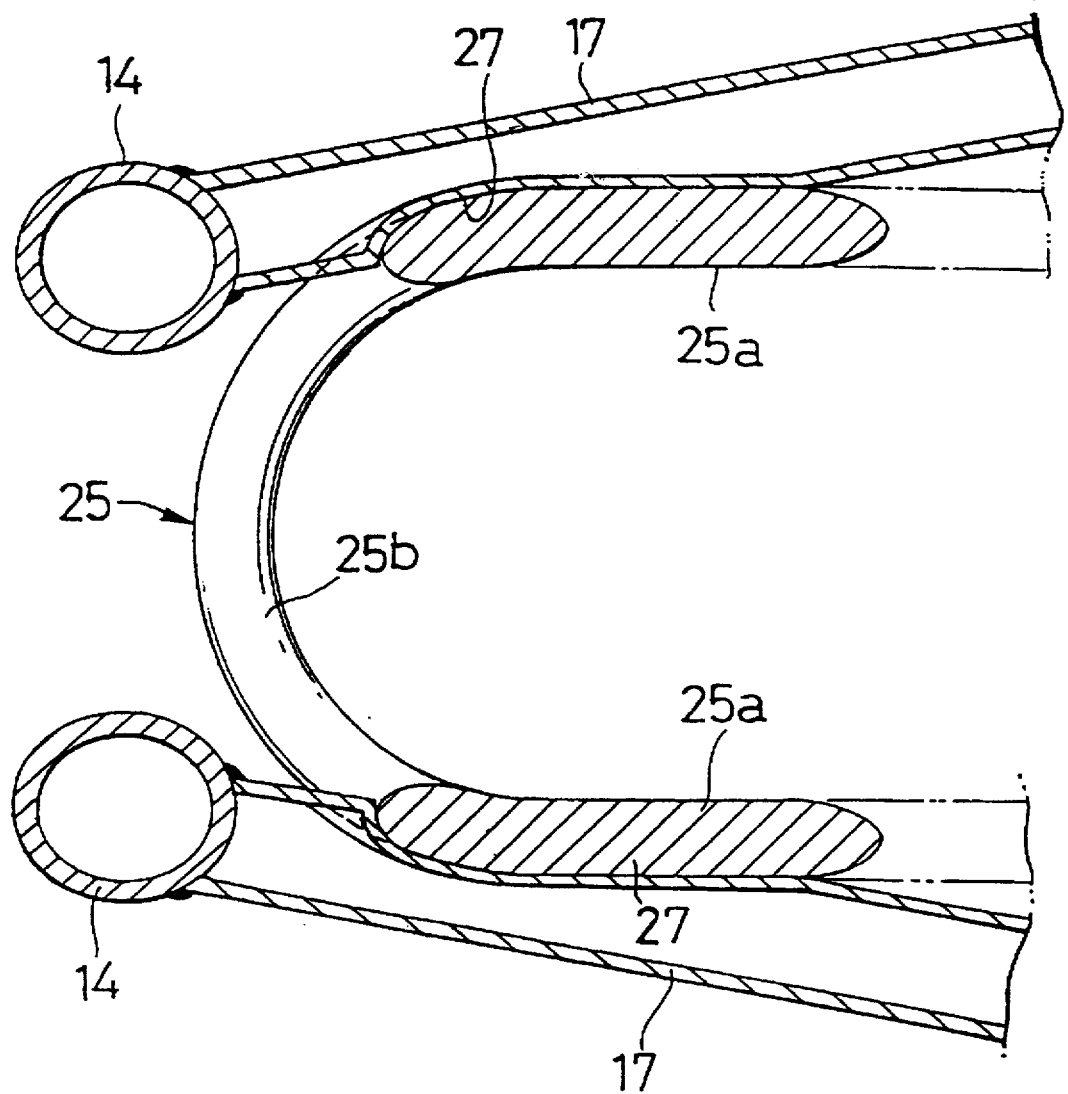
FIG. 5 is an enlarged sectional view taken on line 5—5 of FIG. 2.

Referring to FIGS. 4 and 5, both the seat frames 17 are each connected to the rear, upper portions of the main frames 14 in such a manner that a gap formed therebetween is reduced adjacent to the main frames 14. Fitted recessed portions 27 are each provided in the inner surfaces of the portions, near the main frames 14, of the seat frames 17. The recessed portions 27 are each formed in such shapes that the rear hook 25 positioned with the curved portion 25b forward can be removably fitted in the recessed portions 27 by movement from the rear side.

Specifically, each recessed portion 27 is formed in the inner surface of the seat frames 17 in such a manner as to linearly extend forward, slightly obliquely and downwardly. More specifically, the recessed portions 27 are formed in such a shape so as to be brought into contact with the front surfaces of both of the ends of the curved portion 25b of the hook 25 fitted in the recessed portions 27 and hence to restrict forward movement of the hook 25. Namely, a gap formed between both the right and left recessed portions 27 is gradually decreased as nearing the front ends of the recessed portions 27, that is, a gap formed between the front ends of both the recessed portions 27 is made narrower than a gap formed between the outer surfaces of both the rod-like portions 25a of the hook 25. Moreover, at least a portion of the recessed portion 27 has such a circular-arc section so as to be brought into contact with the outer surface of the hook 25 even at a position lower than a horizontal plane L passing through the centers of the rod-like portions 25a of the hook 25.

In the state where the hook 25 is fitted in the recessed portions 27, the hook 25 is positioned in an attitude substantially along the longitudinal direction of the motorcycle under the seat 12. The recessed portions 27 are thus brought into contact with the outer surface of the hook 25 even at a position lower than the horizontal plane L. As a result, the hook 25, which is fitted in the recessed portions 27, can be prevented from being dropped from the recessed portions 27. In addition, the hook 25 is restricted in the forward movement by the front end portions of the recessed portions 27.

The upper surface of the supporting member 23, positioned between the connecting shaft 21 and the battery box 22, is provided with a long containing groove 23a extending in the direction along the axial line of the connecting shaft 21. The bar 26, which constitutes the U-shaped burglarproof lock 24 in cooperation with the hook 25, is contained in the containing groove 23a when it is disconnected from the hook 25. Accordingly, the hook 25 in the state of being fitted and held in the recessed portions 27 covers the bar 26 contained in the containing groove 23a from the upper side, so that the bar 26 is prevented, by the hook 25, from being released upward from the containing groove 23a.

The supporting member 23 is provided with a pair of restricting plate portions 23b. The restricting plate portions 23b are disposed in such a manner so as to be close, opposite to both the rear ends of the hook 25 in the state of being retained, fitted and held in the recessed portions 27, and hence to restrict rearward movement of the hook 25.

The function of this embodiment will be described below. In the case of operating the motorcycle, an unnecessary U-shaped burglarproof lock 24 is contained in the following manner. After the seat 12 is removed from both of the seat frames 17 of the body frame 5, the bar 26 is contained in the containing groove 23a formed in the upper surface of the supporting plate 23 and the hook 25 is fitted in the recessed portions 27 of both of the seat frames 17. In this case, the insertion of the hook 25 along the longitudinal direction of the recessed portions 27 is difficult because it is obstructed by the rear fender 28, both the restricting plate portions 23b and the like. For this reason, as shown by the broken line in FIG. 2, the hook 25 is inserted between both of the seat frames 17 at such an attitude that the rear portion of the hook 25 is held higher than the rear fender 28. Then, the hook 25 is turned in the direction shown by the arrow around abutment points between the hook 25 and both of the seat frames 17, to be thus smoothly retained, fitted and held in the recessed portions 27. After that, the seat 12 is mounted on both the seat frames 17 in such a manner so as to cover the hook 25.

As described above, the hook 25 of the U-shaped burglarproof lock 24 can be contained under the seat 12 without the provision of any special parts. This results in the reduced number of parts required for the structure for containing the U-shaped lock 24. Moreover, since the hook 25 is positioned at an attitude substantially along the longitudinal direction of the motorcycle when it is contained in the recessed portions 27, it does not appreciably affect the height of the seat or the arrangement space for members positioned under the seat 12.

In this structure, since the recessed portions 27 are each formed in such shapes so as to restrict the forward movement of the hook 25, there can be eliminated the necessity of the provision of any special member for restricting forward movement of the hook 25. This contributes to a reduction in the number of parts required for the structure.

While one preferred embodiment of the present invention has been described in detail, such description is for illustrative purposes only, and it is to be understood that many changes in design may be made without departing from the scope of the following claims.

For example, although the hook 25 and the bar 26 are contained in the state wherein they are separated from each other in this embodiment, the hook 25 and the bar 26 are connected in such a manner that they can by fitted and held in the recessed portions 27 of both of the seat frames 17.

As described above, fitting recessed portions are each formed in inner surfaces of the seat frames in such shapes as to removably fit and hold the hook positioned in an attitude substantially along the longitudinal direction of the motorcycle under the seat. As a result, it is possible to eliminate the necessity of the provision of any special part for containing a U-shaped burglarproof lock and hence to reduce the number of parts. Moreover, since the hook contained in the recessed portions is positioned in an attitude substantially along the longitudinal direction of the motorcycle, it little affects both the height of the seat and an arrangement space for members positioned lower than the seat.

According to the invention, the fitting recessed portions are each provided in the inner surfaces of portions, near the main frames, of the seat frames, the seat frames are connected to the rear portions of the main frames and extend rearwardly therefrom with a gap formed between the seat frames being increased. The recessed portions are each formed in such shapes so as to restrict the forward movement of the hook fitted in the recessed portions with the curved portion forward. As a result, it is possible to eliminate the necessity of the provision of any special member for restricting the forward movement of the hook and hence to reduce the number of parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A U-shaped burglarproof lock for use with a motorcycle comprising:
   a body frame including a head pipe for operably supporting a front fork, main frames extending rearwardly from said head pipe, and a pair of right and left seat frames spaced from each other and extending rearwardly from rear portions of said main frames;
   a seat removably mounted on said seat frames; and
   a U-shaped burglarproof lock including an approximately U-shaped hook having a pair of substantially parallel rod-like portions and a circular arc curved portion formed continuous to one end of said pair of substantially parallel rod-like portions, and a bar for releasably locking an opened end of said U-shaped hook;
   said right and left seat frames including fitted recessed portions each formed in inner surfaces of said right and left seat frames to conform with and to removably retain and hold said U-shaped hook positioned at an attitude substantially along a longitudinal direction of said motorcycle under said seat.

2. The U-shaped burglarproof lock for use with a motorcycle according to claim 1, wherein said seat frames being connected to rear portions of said main frames and extend rearwardly therefrom with a gap formed between said seat frames being increased; and said fitted recessed portions are each formed to conform so as to restrict forward movement of said U-shaped hook fitted in said fitted recessed portions with said curved portion being mounted therebetween.

3. The U-shaped burglarproof lock for use with a motorcycle according to claim 1, wherein said fitted recessed portions of said right and left seat frames are indented portions formed in the thickness of the right and left seat frames.

4. The U-shaped burglarproof lock for use with a motorcycle according to claim 3, wherein said right and left seat frames are tubular members and the recessed portions are substantially semicircular indented portions formed by concave surfaces pressed into the diameter of the right and left seat frames.

5. The U-shaped burglarproof lock for use with a motorcycle according to claim 4, wherein at least a portion of said substantially semicircular indented portions are in contact with an outer surface of said substantially parallel rod-like portions at a position lower than a horizontal plane passing through a center of a diameter of the substantially parallel rod-like portions.

6. The U-shaped burglarproof lock for use with a motorcycle according to claim 1, wherein said fitted recessed portions of at least one of said right and left seat frames are capable of retaining a projection on said rod-like portions.

7. The U-shaped burglarproof lock for use with a motorcycle according to claim 6, wherein said fitted recessed portions of the right and left seat frames are capable of retaining projections on said rod-like portions.

8. The U-shaped burglarproof lock for use with a motorcycle according to claim 1, and further including a groove displaced rearwardly along the length of the motorcycle from said fitted recessed portions for retaining said bar adjacent to said U-shaped hook during storage of said U-shaped burglarproof lock.

9. The U-shaped burglarproof lock for use with a motorcycle according to claim 1, and further including a connecting shaft mounted between said right and left seat frames and restricting plates mounted on said connecting shaft for engaging said opened end of said U-shaped hook for restricting rearward movement thereof.

10. The U-shaped burglarproof lock for use with a motorcycle according to claim 1, wherein said U-shaped hook is mounted in said fitted recessed portions at a rearwardly inclined position for facilitating removal from beneath said seat.

11. A U-shaped burglarproof lock for use with a seat frame of a motorcycle comprising:
    a pair of right and left seat frames having a first end and a second end, said first ends being spaced from each other and extending in a diverging direction to be spaced a greater distance relative to each other at said second ends;
    a U-shaped burglarproof lock including an approximately U-shaped hook having a pair of substantially parallel rod-like portions and a circular arc curved portion formed continuous to one end of said pair of substantially parallel rod-like portions, and a bar for releasably locking an opened end of said U-shaped hook; and
    fitted recessed portions being formed adjacent to said first ends of said pair of right and left seat frames, said fitted recessed portions each being formed in inner surfaces of said right and left seat frames to conform with and to removably retain and hold said U-shaped hook positioned at an attitude substantially along a longitudinal direction and extending towards said second ends of said pair of right and left seat frames.

12. The U-shaped burglarproof lock for use with a seat frame of a motorcycle according to claim 11, wherein said fitted recessed portions are each formed to conform so as to restrict forward movement of said U-shaped hook fitted in said fitted recessed portions with said curved portion being mounted therebetween.

13. The U-shaped burglarproof lock for use with a seat frame of a motorcycle according to claim 11, wherein said fitted recessed portions of said right and left seat frames are indented portions formed in the thickness of the right and left seat frames.

14. The U-shaped burglarproof lock for use with a seat frame of a motorcycle according to claim 13, wherein said right and left seat frames are tubular members and the recessed portions are substantially semicircular indented portions formed by concave surfaces pressed into the diameter of the right and left seat frames.

15. The U-shaped burglarproof lock for use with a seat frame of a motorcycle according to claim 14, wherein at least a portion of said substantially semicircular indented portions are in contact with an outer surface of said substantially parallel rod-like portions at a position lower than a horizontal plane passing through a center of a diameter of the substantially parallel rod-like portions.

16. The U-shaped burglarproof lock for use with a seat frame of a motorcycle according to claim 11, wherein said fitted recessed portions of at least one of said right and left seat frames are capable of retaining a projection on said rod-like portions.

17. The U-shaped burglarproof lock for use with a seat frame of a motorcycle according to claim 16, wherein said fitted recessed portions of the right and left seat frames are capable of retaining projections on said rod-like portions.

18. The U-shaped burglarproof lock for use with a seat frame of a motorcycle according to claim 11, and further including a groove displaced from said first ends of said right and left seat frames for retaining said bar adjacent to said U-shaped hook during storage of said U-shaped burglarproof lock.

19. The U-shaped burglarproof lock for use with a seat frame of a motorcycle according to claim 11, and further including a connecting shaft mounted between said right and left seat frames and restricting plates mounted on said connecting shaft for engaging said opened end of said U-shaped hook for restricting rearward movement thereof.

20. The U-shaped burglarproof lock for use with a seat frame of a motorcycle according to claim 11, wherein said U-shaped hook is mounted in said fitted recessed portions at a rearwardly inclined position for facilitating removal.

* * * * *